United States Patent [19]

Wong

[11] 4,039,405
[45] Aug. 2, 1977

[54] LEACHING COPPER ORES AND SOLVENT EXTRACTION OF THE COPPER-BEARING SOLUTIONS

[75] Inventor: Soon Y. Wong, Ponca City, Okla.

[73] Assignee: Continental Oil Company, Ponca City, Okla.

[21] Appl. No.: 686,441

[22] Filed: May 14, 1976

[51] Int. Cl.² ............................................. C25C 1/12
[52] U.S. Cl. ..................................... 204/106; 75/117; 423/24; 423/27
[58] Field of Search .......................... 423/24, 27, 658.5; 75/101 BE, 101 R, 117; 204/106, 107, 108

[56] References Cited

U.S. PATENT DOCUMENTS

| | | | |
|---|---|---|---|
| 2,831,763 | 4/1958 | Nashner et al. | 423/24 |
| 3,655,347 | 4/1972 | Mattison | 423/24 |
| 3,697,400 | 10/1972 | Pang | 204/106 |
| 3,777,003 | 12/1974 | Mitterer | 75/101 R |
| 3,853,981 | 12/1974 | Hadzeriga | 423/24 |
| 3,863,002 | 1/1975 | Pace et al. | 75/101 R |

OTHER PUBLICATIONS

Agers et al., *TMS Paper No. A72-87*, A.I.M.E., New York, (1972), pp. 1-22.

*Primary Examiner*—O. R. Vertiz
*Assistant Examiner*—Brian E. Hearn
*Attorney, Agent, or Firm*—Cortlan R. Schupbach, Jr.

[57] ABSTRACT

This invention relates to a process whereby recovery of copper from copper ores using leaching and solvent extraction techniques can be increased. The process generally comprises leaching to obtain a pregnant leach liquor, washing ore residues with an extra quantity of water to obtain extra dissolved copper values, recovering said copper values, combining the extra wash water with the pregnant leach liquor, extracting copper values from the total leach liquor to yield a raffinate which still contains some copper values, and cycling part of the raffinate through a low pH extraction circuit to lower the copper values remaining in the raffinate to about 0.01 to 0.02 grams per liter or less before disposal.

11 Claims, 4 Drawing Figures

LEACHING COPPER ORES AND SOLVENT EXTRACTION OF THE COPPER-BEARING SOLUTIONS

This invention relates to a process whereby serious technical and economical problems commonly found in the leaching of copper ores and subsequent solvent extraction of the copper-containing solutions to recover copper are eliminated. More specifically, the invention provides an improved process for washing the leach vats with extra wash water, recovering copper values therefrom, combining the excess wash water with the pregnant leach liquor obtained from the leach vats, solvent extracting the combined copper containing liquor, and cycling part of the post-extraction raffinate through a secondary extraction circuit which operates efficiently at a low pH to lower the copper values to about 0.01 gram per liter or less.

Recovery of metal values from metal bearing ores using leaching processes have been used for many years. Generally, the process followed has been simply leaching the crushed ore with a suitable material for leaching, such as an acid, in vessels for periods of time sufficient to extract the metal values from the ore. In copper leaching, for example, the time ore remains in a vat can range very widely. While undergoing the different leach operations, a series of vessels are used such that once underway, a process can continue without interruption while undergoing the steps of loading fresh ore, leaching the ore, recirculating solutions, making pregnant liquors, washing the ore residues, draining wash waters, and unloading the spent ore in a completely cyclic manner. Preferably the pregnant leach liquor produced in the vat system is removed about once a day, and fresh ore is loaded into an empty vat once each day.

The cycle time for each vat is determined by the total time required to carry out the necessary operations of the leaching process, including the time needed for repairing, draining, unloading, loading, washing, advancing the leaching solutions from one vat to another, recirculating the solutions within a vat and for producing the pregnant liquor. As the leaching cycle of a vat progresses from the day ore is first placed in the vat to the day that the ore is washed prior to removal, ore residues in the vat become progressively lower in metal values. Typically the oldest vat (that which has been undergoing leach for the longest time), when complete, is washed one or more times, this water being sent (advanced) to the next oldest vat. In turn, the leaching solution from this vat is simultaneously advanced from this vat to the next oldest vat. Such advances are continued until the leaching solution enters the vat containing freshly charged ore. The solution removed from this vat is the pregnant leach liquor. The pregnant leach liquor is then sent to an extraction circuit containing one or more stages wherein the copper values are recovered, and the recycle stream, still containing some copper values, and called a raffinate stream, is recycled, all or in part, to the vat for additional wash effect. This stream becomes a part of the solution that advances through the vat system.

This system has long been known to be inefficient with respect to economic value and to recovering all possible copper values from the ores used. Other leaching systems such as agitation leach, heap leaching, and dump leaching are also subject to a degree to the same economic and technical problems.

Heap and dump leaching do not use wash waters but in some preferred modes of operation these technical problems can be lessened by the essential features of the process of this invention.

For the purposes of the instant invention, generalized copper ore vat leaching processes have been utilized. A cycle time of about 10 days has been selected. The vat system contains about 10 vats. During operation on any given day, for example, the No. 1 vat will be loaded with fresh ore while No. 2 vat will be unloading spent ore, No. 3 vat will be undergoing final water wash, No. 4 vat will be undergoing leaching, Nos. 5 through 9 will also be undergoing leaching, and No. 10 will produce the pregnant leach liquor. On the previous day, No. 10 vat was loaded with fresh ore. The pregnant leach liquor is always produced from the vat containing freshly charged ore.

In the heretofore preferred manner of operation, final vat wash waters are temporarily sent to storage for use as the initial wash of the following day. Simultaneously the leaching liquors are sequentially passed or advanced through Vats 4 through 10. It may be preferred to recirculate the leaching liquors within each vat during a part of the day's operations. Acid may be added to any vat or vats in the leaching portion of the cycle during the solution advance or recirculation period.

Wash waters in the leaching system must be controlled to the proper balance. The water leaving the total vat system is made up of water leaving with the residual ore being removed from vats, mechanical and evaporation losses, and that contained in the pregnant liquor. Water entering the system is made up of wash water, recycled water such as that recycled as raffinate, usually containing some copper and acid values, water contained in the freshly charged ore, and water added to agglomerate fines in the freshly charged ore. Other water losses or additions can be accounted for if these occur.

Water material balances necessary in prior art processes do not allow efficient washing of the residual ore residues in order to wash out and recover dissolved copper values remaining in the ore bed. The amount of wash water is limited, as can be seen in the water material balance given before.

The pregnant liquor so produced is sent to a solvent extraction circuit having one or more extraction stages. Herein most of the copper values are recovered, and a raffinate stream is produced. Said raffinate stream still contains a large quantity of copper, usually ranging from about 0.2 to about 0.8 grams per liter or more, depending upon the design and operation of the extraction system, the extraction agent used, and the acidity of the leach solution, and other technical factors. Some of the copper-containing raffinate is recycled to the vat leaching system. However, some raffinate must be purged from the system to control the buildup of deleterious impurities in the pregnant leach liquor, such as the salts of sodium, calcium, silica, iron, aluminum, and others. All copper values in this portion of the raffinate are normally lost.

It can be clearly seen that the prior art process leaving copper in the unrecovered or purged raffinate leads to serious economic loss. These values are not recovered by current methods. All copper values in this portion of the raffinate are lost if extra steps or procedures are not used to recover them.

It can be clearly seen that the prior art process leaving copper in the unrecovered or purged raffinate leads to serious economic loss. These values are not now recovered by current methods that are technically desirable or economically attractive. There are several possible means for recovering such copper values, such as by cementation with metallic iron, or by chemically precipitating the copper values, such as by reaction with hydrogen sulfide or sulfide-containing chemicals, such as sodium sulfide. These are costly procedures which are undesirable.

It is well known that solvent extraction is highly desirable and necessary to obtain maximum recovery of dissolved copper values. Extra wash water as defined herein refers to the quantity of water over and above that required by the system to maintain the required and normal water material balance. Thus, extra wash water cannot be used in and become a part of the leaching system because of the material balance restrictions. Heretofore extra wash water if used has been removed from the vat system and sent to an iron cementation plant for copper value recovery from the wash water. This, however, is undesirable, as set forth above, since the process is expensive and produces only an impure product that must be further processed before use.

All leaching systems for copper bearing ores are subject to one or a combination of the restrictions described herein. It is clear that as copper ores become less available and contain less copper that it would be highly desirable to develop a system which allows a higher recovery of copper while mantaining or reducing the cost of installation and operation.

It would be of great benefit to use a system which would allow effective washing of leached ore residues, improve processing and handling of the leached ore residue wash water without requiring extra and undesirable facilities, and maintaining a single feed to extraction facilities, minimizing the number of extraction stages needed, the size of equipment needed, and amount of expensive extraction materials required, while purging the required amount of an aqueous stream to prevent the buildup of undesirable impurities in the system.

As stated above, leaching processes have long been known in the art. Representative examples of such processes can be found in U.S. Pat. Nos. 3,455,680; 3,761,249; 2,993,782; 3,399,055; 3,224,873; 3,104,971; 3,440,036; and 3,878,286. These patents all relate to various methods for recovering copper from solution; however, none of the inventions have shown or provided a method for solving many of the economic and technical problems inherent in leaching nor for recovering the greatest amount of copper from solution. It would be of great benefit to be able to extract or recover more copper from the ore residues, reduce costs in processing, and recover more copper as metal.

It is therefore an object of the present invention to provide an improved process for obtaining copper from copper-bearing ores using leach processing and solvent extraction processing. Other objects will become apparent to those skilled in this art as the description proceeds.

It has now been discovered, according to the instant invention, that the objects of the invention can be obtained by utilizing an improved process for the recovery of copper values from copper bearing ores comprising (a) leaching the ore with mineral acid in the presence of water to produce a pregnant liquor stream containing dissolved metal values, and washing the leached ore residue with an internal recycle stream from step (c) in addition to other wash waters, (b) passing additional extra water through the leach vessel containing spent ore residues, said ore being disposed and said water being removed from the vat leaching system and subsequently combined with the pregnant liquor stream from step (a) to form a resultant stream which is then passed through (c) first a solvent extraction system containing at least one extraction stage containing an extraction agent for removal of said metal values, said first extraction system producing a loaded organic extraction stream containing the metal values and an aqueous raffinate stream containing metal values not extracted from the resultant stream of step (b), and separating said raffinate stream into a first internal stream of aqueous raffinate and a second internal stream of aqueous raffinate, (d) passing the first internal raffinate stream back to step (a) of the system, and (e) passing the second internal raffinate stream to a second extraction system having at least one extraction stage containing a second extracting agent where the metal values are extracted in the presence of a low pH extraction agent, said extraction stage producing a loaded organic stream and a disposal stream, while (f) the copper values in the loaded organic stream from step (e) is stripped or removed from the loaded organic stream in a system containing at least one stripping stage in the presence of sufficient stripping acid containing aqueous stripping agent, resulting in a stripped organic stream from which the copper values have been removed and a loaded stripping acid stream containing the recovered copper values, (g) recycling the stripped organic stream from step (f) to the extraction stage of step (e), while (h) the loaded stripping acid stream of step (f) containing recovered metal values and excess acid is passed to the process described in step (a), and (i) the loaded organic stream produced in step (c) is passed through at least one stripping stage wherein a stripped organic stream and a pregnant electrolyte stream containing the copper values is produced, subsequently (j) recycling the stripped organic stream to the resultant stream extraction described in step (c), while (k) passing the pregnant electrolyte to a metal recovery process from which exits a spent electrolyte stream which is recycled to step (i) after addition of any acid needed as a stripping agent, and (l) recovering the metal values as metal from step (k).

It will be apparent that while the above process is directed to vat leach processes, it can also be used in combination with agitation leaching, dump leaching, heap leaching, etc. While the process described is directed toward copper values, other metal values can also be obtained using the process of the instant invention.

The technical and economical advantages of combining the various aqueous solutions with the primary pregnant liquor from the leach are many. Concentrations of the active extraction agent in the extraction solvent can be reduced, lowering the cost of said solvent. Settling rates of the mixed organic and aqueous phases are more rapid, reducing settler sizes. Inventories of the expensive extraction reagent are significantly reduced. Copper concentrations of the raffinates are greatly reduced without installing a prohibitive number of extraction stages.

The economical and efficient processing of the combined aqueous solutions enables washing of the spent ore in the leach vats with the larger quantity of water heretofore possible in most leaching operations. While in the past excess wash waters containing copper were sent to cementation plants for metal recovery, the process was excessively expensive, yielding an impure product which required additional refining before it can be marketed. Under the process of the instant invention, effective washing is obtained which greatly reduces the amount of dissolved copper otherwise lost in the ore tailings. An effective and economical way of handling the extra wash water is provided.

The preferred manner of operating the first extraction circuit containing a low copper concentration feed allows operation of the second extraction circuit to recover almost all copper in the feed with a solvent extraction facility containing a small number of extraction and stripping stages.

Recycle of the loaded stripping acid from the second extraction system containing the recovered copper to the leaching circuit as part of the acid feed of said circuit is a significant and important feature of the instant invention. The use of a low pH extraction reagent results in a loaded stripping acid so high in acid concentration that the copper cannot be practically recovered using methods such as electrowinning. Other costly methods of copper recovery would therefore have to be utilized, for example, such as crystalizing the recovered copper values as copper sulfate. These problems are avoided in the instant invention.

The invention likewise allows discard of solutions containing undesirable quantities of inorganic salts. Without ths discard, such undesirable inorganic salts would soon build up to unacceptable levels in the leaching circuit. The reduction of the copper content in the final purge solution is to levels sufficiently low in metal values to avoid serious economic loss, said low levels being easily obtainable without utilizing costly and undesirable processes such as cementation.

BRIEF DESCRIPTION OF THE DRAWINGS

FIG. 1 is a schematic drawing showing the process of the instant invention. In the FIGURE, a vat leach 1 process whereby at least one vessel is equipped to allow extraction of metal values from metal-bearing ores passes as pregnant liquor to the primary extraction process 2 wherein at least one extraction stage is utilized to obtain the raffinate stream and the loaded organic extract. A stripping stage 3 produces a pregnant electrolyte which is passed on to an electrowinning stage 4 which produces the solid metal and a spent stripping electrolyte. The secondary low pH extraction process 5 accepts the aqueous raffinate second internal stream, then produces a loaded organic stream 21 and a discard stream 20. A stripping stage 6 produces a loaded stripping acid stream 30 which passes to an acid mixer 7 wherein fresh acid is added as make-up 8 before being passed to the vat leaching 1. Fresh water as wash water is added through line 9 in quantities to satisfy the water balance of the process while the excess fresh water of the instant invention is added as stream line 10. This water does not advance into the leaching system but is removed as stream 12. The vat pregnant liquor 11 is combined with the extra wash water 12. The two streams 11 and 12 are combined to form a composite feed stream 13 which is passed to the first extraction system 2. There a loaded organic stream 14 is produced as well as a first internal raffinate stream 15 and a second internal raffinate stream 16. The loaded organic stream 14 passes to the first stripping system 3 which produces a pregnant electrolyte 17. After passing through conventional electrowinning 4 the spent stripping electrolyte 18 is passed again through the stripping system 3 which in turn passes a stripped organic 19 back to the extraction system 2 for subsequent extraction. The low pH extraction systems receive aqueous raffinate 16 and produces a discard aqueous stream 20 and a loaded organic stream 21. The loaded organic stream is stripped in stripping system 6 producing a stripped organic solvent 22 recycle to the low pH extraction system 5 and a loaded stripping acid 23 or 30 which is passed through an acid mixer 7 where fresh acid is added 8 to form an incoming acid stream 24 which is passed to the vat leach 1. Fresh stripping acid containing 25 water is added to stripping system 6. The first internal raffinate stream 15 from extraction system 2 is recycled back to the vat leaching system 1 and is a part of the water balance of the vat system.

It will likewise be apparent to those skilled in this art that, under the broad guideline set forth above that yet other variations can be made which will provide benefits, dependent upon the process desired. For example, when a vat leach is used, the loaded acid stripping stream of step (f) can be passed through an acid mixing stage where sufficient fresh acid is added to yield a solution containing the total desired amount of acid for the process of step (a).

Figure 1:
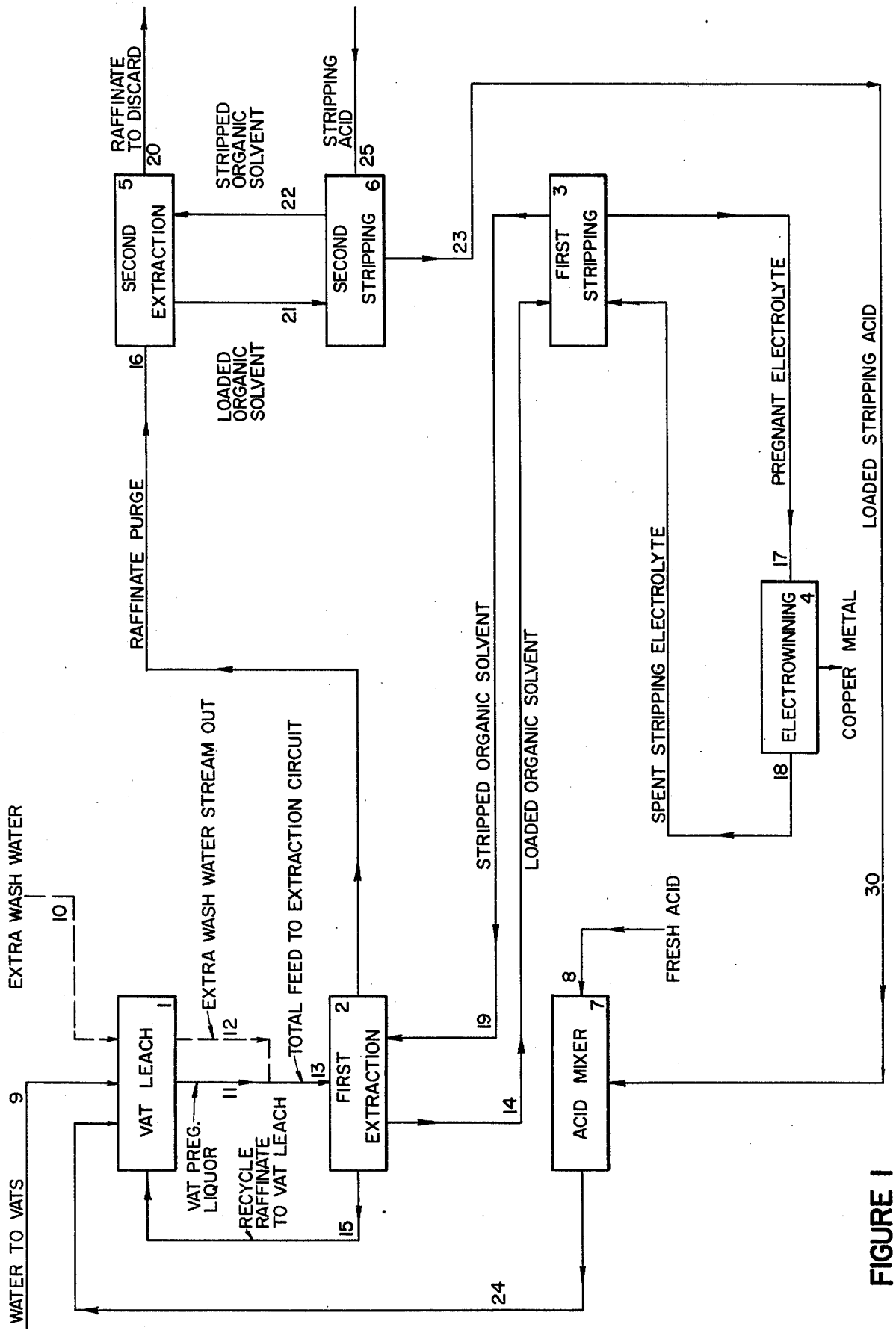
FIG. 1 is a schematic describing the overall process.
Figure 2:
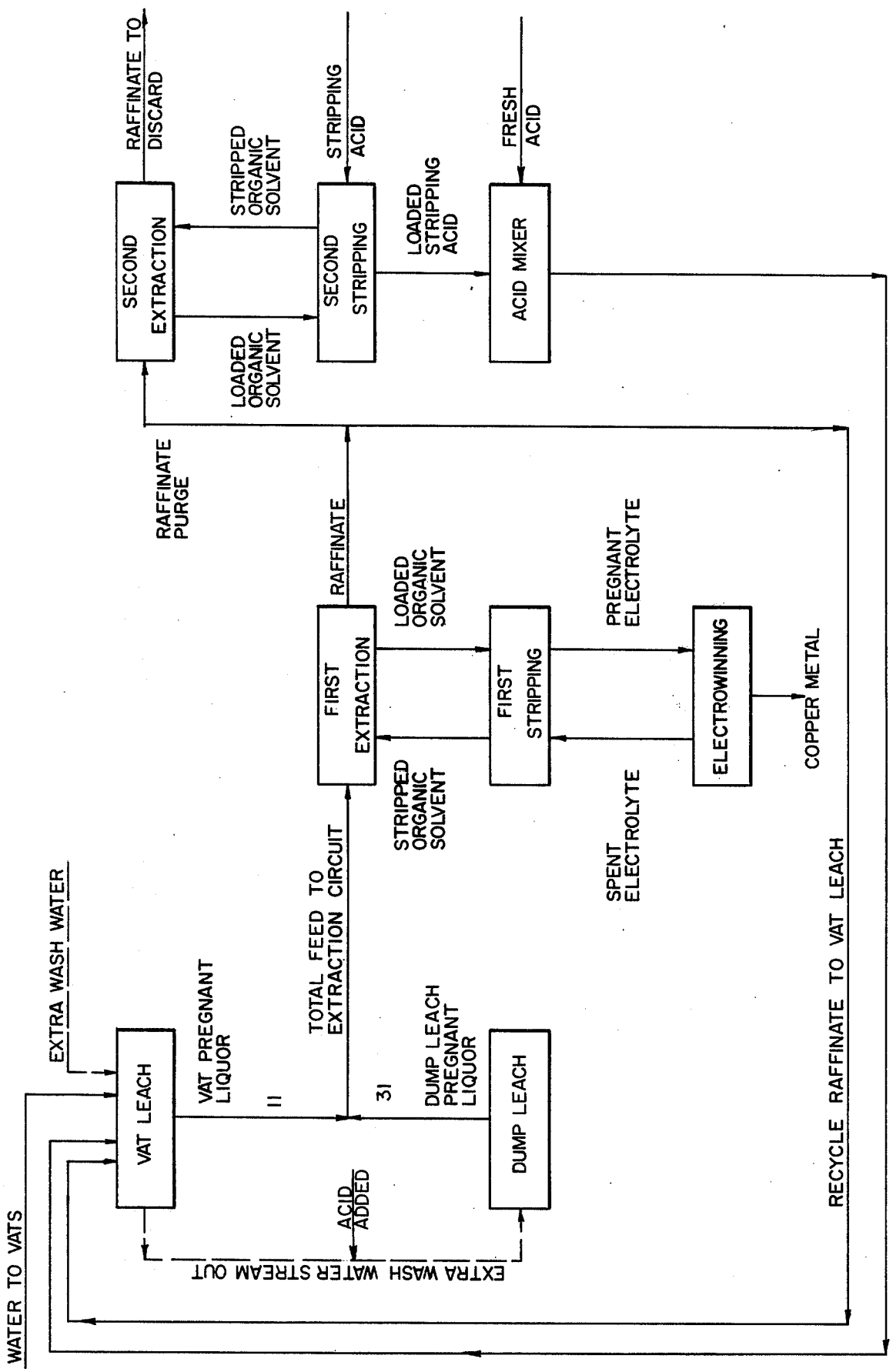
FIG. 2 is an alternate process using the wash water.

Yet another process could utilize the wash water of step (b) by removing it from the vat leach system, adding acid and utilizing the resulting solution as a leaching agent in a dump or heap leach producing a second pregnant liquor stream 31 which may be combined with the pregnant liquor stream 11 from the vat leach and the combined stream can be extracted in the first extraction stage 2. Such a variation is shown in FIG. 2, wherein the basic process is set forth with the variations included.

Figure 3:
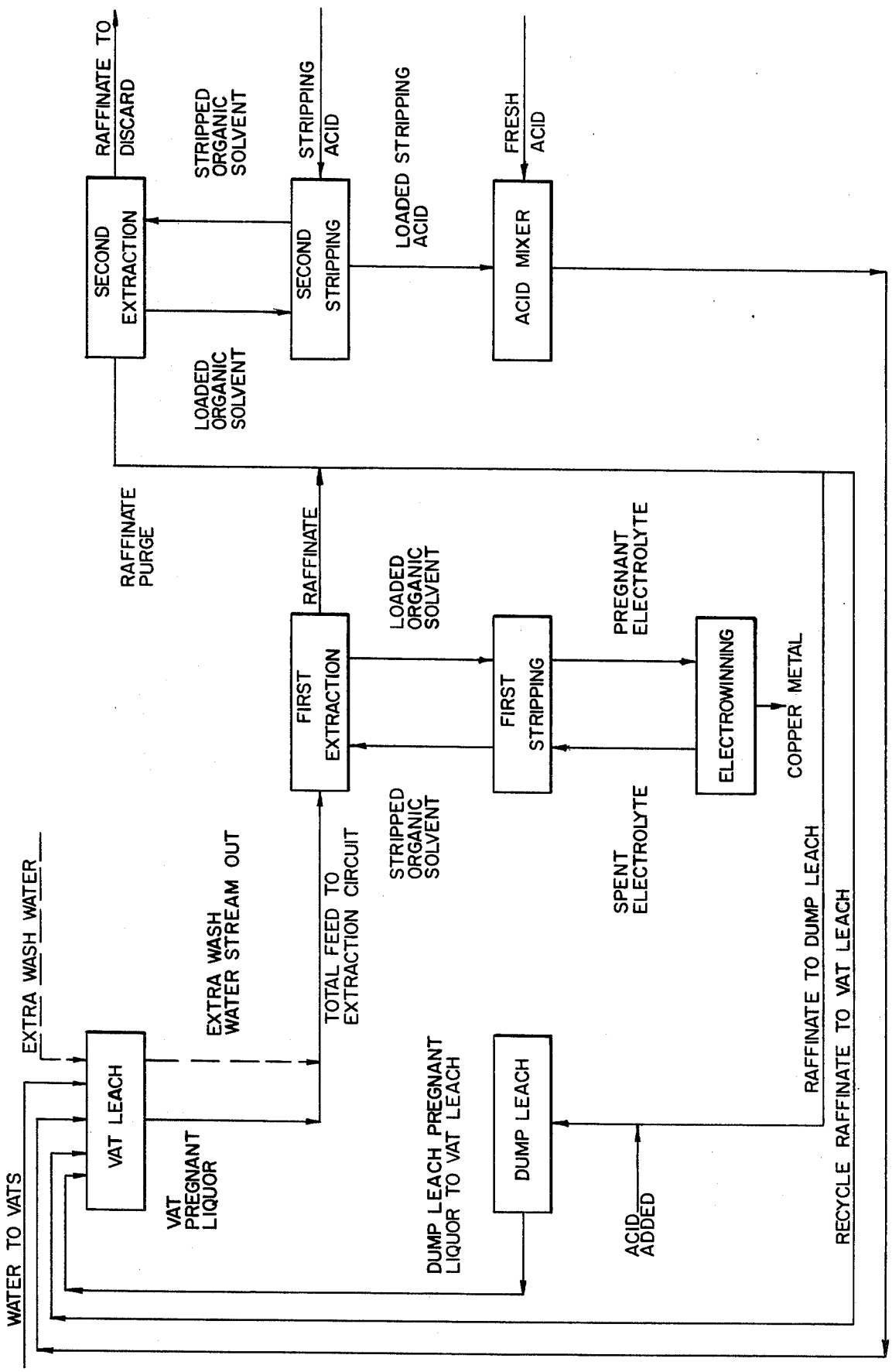
FIGS. 3, 4 show uses for the internal recycle stream.

It will likewise be apparent that the internal raffinate recycle streams described above can be utilized in differing manners. For example, the first internal stream of raffinate of step (c) can be further divided to form a third and fourth recycle stream, the third recycle stream passing to step (a) of the process and the fourth recycle stream being combined with acid to form a leach agent for a dump or heap leach producing a pregnant leach liquor. The process can be further modified by using the pregnant leach liquor from the dump leach as part of the vat leaching solution, combining the pregnant leach liquor of step (a) and the wash waters of step (b) to form the feed to the extraction stage of step (c). Such a process is shown in FIG. 3.

Figure 4:
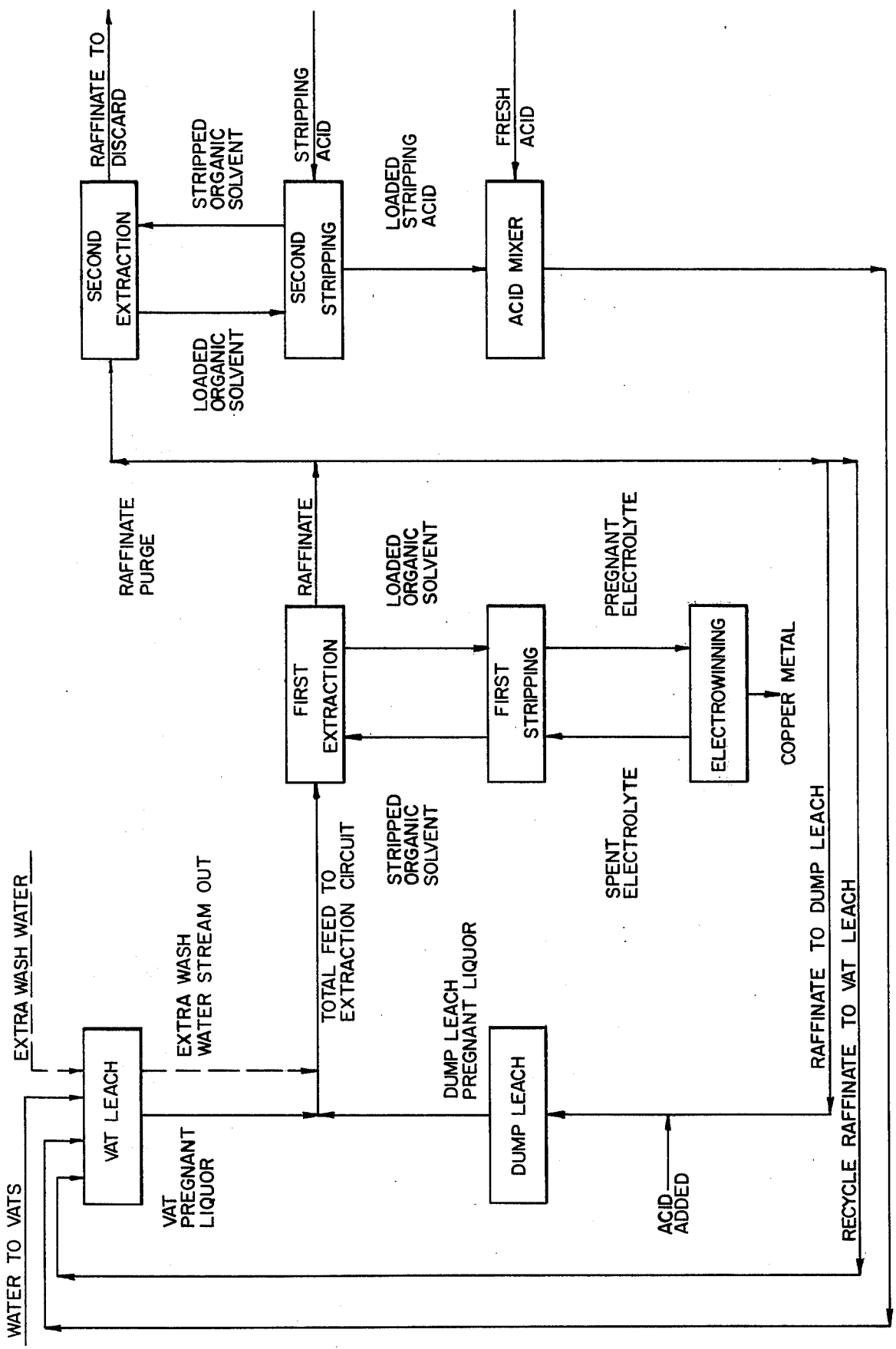

Also, for example, the pregnant leach liquor from the dump leach can be combined with the pregnant leach liquor from the vats and the extra wash water to form a combined feed stream to the first extraction as shown in FIG. 4. All raffinate purged from the first extraction system goes into the second extraction system in all cases. The second extraction system raffinate is purged to disposal to prevent buildup of undesirable salts as set forth above.

In these examples, the raffinate purged from the leach system or combination of leach systems is sent to the second extraction and stripping system for recovery of material values. The resultant raffinate, containing only very low quantities of metal values, is discarded.

The amount of raffinate from the first extraction system that must be removed and processed in the second extraction system is determined by the amount of solution that is purged from the leach system to control salt buildup. The quantities of first extraction raffinate that is sent to, for example a dump leach operation, will depend upon the size of the dump leach operation and the preferred rate of applying leaching solution to the dump. The remainder of the raffinate is then recycled directly to the vats.

It will be apparent to one skilled and knowledgable in this art that the above modifications set forth and others like them can be made within the basic process scheme once known. The instant invention provides a unique combination of extra wash water and extraction circuits to wash the spent ore residues to place maximum metal values in solution while utilizing a second extraction circuit operable under low pH conditions to maximize ultimate metal recovery from the solutions of the process. Clearly, the two are useful only in combination, since recovering metal values from ores as solution is of no benefit, if the metal values cannot be recovered from solution. Present techniques utilize only a primary extraction circuit, the remaining metal values being lost as purge or unrecoverable due to low pH solutions. As indicated before, metal values can be recovered but such prior art processes are undesirable and costly.

Having explained the invention in detail, a more concrete description is provided with reference to the examples below. It is emphasized that the examples given are intended to exemplify the instant invention and should not be construed to limit it. Example 1 is a comparative example showing the state of the art at the time of the invention. Example 2 is an example which shows the effect of extra wash water which is not advanced through the leaching vessels. Example 3 shows the effect of extra wash water and a second low pH extraction circuit.

EXAMPLE 1

A conventional vat leaching system containing a required number of vats per line and the required number of lines of vats to leach 30,000 tons of copper ore per day will be employed. In this example, two parallel lines of vats are preferred to handle the 30,000 tons of copper ore per day. Each line contains ten vats. Each vat has a capacity of 15,000 tons of ore. The ore contains about 0.48 percent by weight total copper of which about 75 percent is dissolvable by the acid leaching solution in the preferred manner of operation. About 3,240,000 gallons per day of a pregnant liquor containing about 7 to 8 grams per liter of copper is produced by the vat system described. This pregnant liquor is sent to a solvent extraction circuit wherein a loaded organic stream is produced. The loaded organic stream is sent to the stripping section where a stripped organic solvent is produced and recycled to the extraction section. A pregnant electrolyte obtained in the stripping section is sent to electrowinning to recover the copper as metal.

The raffinate that is produced in the extraction section will contain some unextracted copper. Using a reasonable number of extraction stages, i.e., 3 or 4, an extraction solvent containing about 40 percent by volume of a commercially available extracting agent, such as LIX 64-N, and 60 percent of a conventional diluent, such as kerosene, and using an organic solvent to aqueous feed ratio by volume of 1.5 to 1, the raffinate will contain about 0.9 grams per liter of copper which is not extracted.

All of the raffinate so produced cannot be recycled to the vat leaching system since concentrations of undesirable and harmful inorganic salts will build up to levels that are intolerable in the leaching and solvent extraction steps. In the instant example about 50 percent of the raffinate is recycled to the vat system and the remainder must be purged and disposed, although somewhat more or less raffinate can be recycled or purged. Thus, the purged raffinate amounts to about 1,620,000 gallons per day. The copper contained in this stream would amount to about 12,155 pounds per day. Such a loss, if not recovered, is excessively costly.

Engineering design calculations show that the total volume of settling vessels in the extraction section of a system such as described amounts to about 673,000 gallons. The inventory of the extraction agent, here LIX 64-N, on a basis of the process described in the mixing chambers, and settling tanks amount to about 44,460 gallons, calculated as the undiluted, extraction reagent LIX 64-N.

For simplicity, the volumes of extraction solvent in the stripping section are not here considered for purposes of comparing the different processes.

EXAMPLE 2

The same vat leaching system as described in Example 1 will be employed at a leaching rate of 30,000 tons per day of the same copper ore. Again about 3,240,000 gallons per day of a pregnant leach liquor is produced as a conclusion of the usual leaching and washing procedures. The vat containing the ore residues that are to be removed and discarded from the vats is washed further with an extra 3,420,000 gallons per day of water; however, more or less of this quantity of extra wash water could be used. The extra wash water does not go or advance into the vat leaching system but is removed after the washing function and added to the pregnant leach liquor, thus maintaining the proper balance of water in the vat leach system. The combined total of 6,660,000 gallons per day is then sent as a feed to an extraction-stripping circuit similar to that of Example 1.

In the solvent extraction circuit, there is produced a loaded organic stream and a raffinate stream containing unextracted copper values. Again, about 50 percent of the raffinate is discarded in order to control inorganic salt buildup. The remainder is recycled to the vats. In the instant example, 51.3 percent of the total raffinate fluid is purged. Thus about 3,420,000 gallons per day of raffinate per day is purged and about 3,240,000 gallons per day of raffinate is recycled to the vat leaching system.

The combining of the extra wash water used with the pregnant leach liquor from the vats results in a feed containing about 3.4 to 3.6 grams per liter of copper. This combined stream is the feed to the extraction circuit.

Because of the decreased concentration of copper in the combined feed to the extraction circuit, the extraction section can be designed to take advantage of using an extraction solvent containing a substantially lower concentration of the reagent, a faster settling rate in the settling tanks and an improved equilibria relationship between extraction solvent and the aqueous, copper-containing solution.

Thus in the instant example, calculations show that an extraction solvent containing 20 volume percent LIX 64-N in a kerosene diluent would be suitable. Again, four extraction stages would be used. Thus the total settling tank volume would be 738,068 gallons. The inventory of undiluted LIX 64-N, in the mixing chambers and settling tanks amounts to about only 25,854 gallons compared to 44,460 gallons of the Example 1 process.

Operating the extraction section at an organic to aqueous ratio of about 1.0 to 1, the unextracted copper in the raffinate amounts to about 0.2 grams per liter as compared to the 0.9 grams per liter shown in the prior art Example 1.

The volume of the raffinate purge is 3,420,000 gallons per day with a copper content of 0.2 grams per liter. Thus the loss in copper per day amounts to 5,702 pounds. This may be compared to the 12,155 pound loss per day of Example 1. The use of the extra wash water and the method of handling decribed herein as a part of the invention is clearly illustrated to be a distinct improvement in the overall copper recovery.

EXAMPLE 3

Again, 30,000 tons of ore per day is treated in the same vat leach system described in Examples 1 and 2. The ore contained the same amount of copper as previously described. Pregnant leach liquor in the amount of 3,240,000 gallons per day will be produced. More extra wash water than was described in Example 2 will be used, the system being washed with 4,212,000 gallons per day. The extra wash water is used to wash the ore residues in the vat from which the residues are to be removed. The extra wash water does not advance into the vat leaching system but is removed from the system after used as wash. This wash water is combined with the 3,240,000 gallon per day pregnant leach liquor. The combined solution equals 7,452,000 gallons per day and will contain about 3.1 to 3.2 grams per liter of copper. This combined feed is sent to a first extraction circuit.

In the first extraction circuit, three extraction stages are used. An extraction solvent containing 15 percent LIX 64-N and 85 percent by volume of kerosene is used. An organic to aqueous ratio of 1.0 to 1 is also employed in the extraction section. Because of the low extraction agent concentration, faster settling rates are obtainable in the settling tanks. The total settling tank volume amounts to 516,120 gallons. The amount of undiluted LIX 64-N in the mixers and settling tanks amount to only 18,994 gallons.

The raffinate from this first extraction system will contain about 0.4 grams per liter copper under the operating conditions described. The copper concentration of the raffinate at this point in the process is preferably allowed to be somewhat larger than that of the raffinate described in Example 2. This tends to lower costs in the first extraction system without incurring a cost penalty in the second extraction system. Lower concentrations such as 0.3 grams per liter or less could be achieved, however.

Thus 3,240,000 gallons per day of the first extraction system raffinate is recycled directly to the vat leaching system. The remainder of the raffinate, amounting to about 4,212,000 gallons per day, is removed from the vat leaching system and is sent to a second solvent extraction system. In this second solvent extraction system, an extraction solvent is employed which is effective for extracting copper values under conditions of a low pH (high level of acid) while still maintaining favorable extraction equilibria and kinetics. For this example, LIX-70, a General Mills product, specifically prepared for use in copper extractions containing high acid concentrations can be used.

In the particular feed compositions of the instant example, the low pH extraction system, engineering calculations show that one extraction stage would be needed although more could be used, such as two or three stages. The extraction solvent would have about 5 percent of LIX-70 by volume in a typical kerosene diluent. Higher concentrations could be used. The organic to aqueous working ratio is about 1.0 to 1.

The settling tank volume of the second extraction circuit would be about 35,000 gallons. The inventory of undiluted LIX-70 amounts to only 804 gallons in mixers and settling tanks of the extraction system.

Operating under these conditions a loaded organic solvent is produced. This loaded organic solvent is preferably stripped in a stripping section. Preferably the stripping agent is an aqueous solution of a mineral acid, preferably containing sulfuric acid to about 350 to 400 grams per liter of acid. If available, a solution containing some copper values plus this same range of acid can also be used as the stripping agent, if preferred. The stripping acid removes the copper values from the loaded organic solvent. The strippd organic solvent is recycled to the extraction section for extracting additional feed. The stripping acid containing the recovered copper is preferably mixed with additional acid in quantities required by the vat leaching operations, and the solution is sent to the vat leaching system for leaching.

The raffinate of the second extraction system is found to contain only 0.02 grams per liter of copper. Lower values such as 0.01 grams per liter or less can of course be obtained by making proper changes in the extraction circuit. Under the conditions of the instant example, it is seen that copper values in the discarded raffinate solution from the second extraction circuit amounts to only 703 pounds of copper per day. The reduction of potential copper losses from the extremely high levels of about 12,155 pounds per day of Example 1 to the improved daily potential loss of 5,702 pounds described in Example 2 to the very economically acceptable level of 703 pounds per day of Example 3 clearly shows the improved advantages of the process of the instant invention.

The extraction agents used in the process of the instant invention are alpha hydroxy oximes and benzophenone oxime reagents which are available commercially under the trade name LIX sold by General Mills Corporation, and sold under the name KELEX by Ashland Chemical Co. These reagents can also be beta alkenyl-8-hydroxy quinoline materials. Representative examples of such oximes and quinolines are 2-hydroxy-5-nonyl acetophenone oxime, 5-alkyl-2-hydroxyphenyl alkyl ketoximes, 8-hydroxyquinolines, 2-hydroxy-3'-methyl-5-ethylbenzophenoxime, 2-hydroxy-5-(1,1-dimethylpropyl)-benzophenoxime, 2-hydroxy-5-(1,1-dimethylethyl)-benzophenoxime, 2-hydroxy-5-octyl-benzophenoxime, 2-hydroxy-5-nonyl-benzophenoxime, 2-hydroxy-5-dodecyl-benzophenoxime, 2-hydroxy-2',4'-dimethyl-5-octylbenzophenoxime, 2-hydroxy-2',3',5'-trimethyl-5-octylbenzophenoxime, 2-hydroxy-3,5-dinonylbenzophenoxime, 2-hydroxy-4'-(1,1-dimethylethyl)-5-(2-pentyl)-benzophenoxime, 2-hydroxy-4'-(1,1-dimethylethyl)5-(2-butyl)-benzophenoxime, 2-hydroxy-4-dodecyloxybenzophenoxime, 2-hydroxy-4'-

(1,1-dimethylethyl)-5-methyl-benzophenoxime, 2-hydroxy-4′,5-bis-(1,1-dimethylethyl) benzophenoxime. Other reagents which may be preferred are the alkyl hydroxyphenyl alkyl ketoximes, such as 2-hydroxy-5-nonyl acetophenone oxime, offered by Shell Chemical under the trade name SME (Shell Metal Extractant) 529. Another potential extraction reagent of the hydroxy oxime, type is Acorga $P_1$ or $P_{17}$, substituted salicylaldoximes, produced by Acorga, a European Company. Others still under development but not yet offered commercially would be suitable in the process of the instant invention.

These reagents, however, are not exceptionally successful or effective at the very low pH conditions that normally are encountered in the secondary extraction circuit. Depending on the acid concentrations of the aqueous feed to the secondary extraction circuit, some of the above reagents could possibly be used. For the second extraction stages, a low pH metal extraction reagent such as LIX 70 (a chlorinated hydroxy benzophenone oxime) sold by General Mills must be used, the one named being presently preferred. Other reagents may yet be developed which could be used in the secondary extraction system if they are found to be effective at conditions of high acid concentrations in the aqueous feed.

The liquid ion exchange materials exemplified above are described in U.S. Pat. Nos. 3,878,286, other patents, and the Journal of Chromatography Volume 105, pages 141–150, 1975, Ashbrook, entitled Commercial Chelating Solvent Extraction Reagents.

It is known to those in the art that other extracting means may be utilized in the process of the instant invention. For example, continuous ion exchange resins may be utilized instead of the liquid ion exchange methods set forth.

Research to develop metal extraction agents is underway which can be applied to the various steps of the instant invention.

Solid ion exchange resins operating in continuously moving beds, fluidized beds, or fixed beds may be used instead of the liquid reagents used in the examples and illustrations of the instant invention. Some such resins are described in the Journal of Applied Chemical Biotechnology, Volume 24, pages 687–700, 1974. The use of certain inorganic solid particles which have been impregnated with the conventional liquid extracting agents described in this invention would be beneficial under some conditions. Solid resin systems could of course operate with clarified liquors or in resin-in-pulp systems. It can be clearly seen that the two extraction systems of the instant invention could, for example, be a solid resin process for the first extraction stage and a liquid process for the second or vice versa or a completely solid resin system.

Chelating ion exchange resins could also be used in the process of the instant invention. Such resins are described in *Extractive Metallurgy of Copper*, Yannopoulos and Agarwal, the Metallurgical Society of AIME, Vol. II, Chapter 52, 1976. These resins are easily employed in the instant process set forth in place of the liquid solvent extraction agents set forth. For example, such resins can be used to extract copper from the feed solutions from the vat leach, and also from the raffinate stream resulting from the first extraction. Thus, various combinations of recovery can be used, such as liquid-liquid, liquid-solid, solid-liquid, and solid-solid. Such solid resins lend themselves to use in fluid or fluidized beds, moving beds, or any of the various countercurrent extraction methods for the purposes of the instant invention.

It is preferred that elution of the loaded ion exchange resins or gels be made with streams containing sulfuric acid. The eluate containing the recovered copper can be returned to the vat leaching system in mixture with added acid as exemplified above. It may be preferred to send the eluate containing the recovered copper, after combining with the pregnant electrolyte of the first extraction, directly to the electrowinning cells provided the acid in the eluate is compatible with the acid content of the pregnant electrolyte.

While certain embodiments and details have been shown for the purpose of illustrating this invention, it will be apparent to those skilled in this art that various changes and modifications may be made herein without departing from the spirit or the scope of the invention.

I claim:

1. A process for the recovery of copper values from copper-bearing ores comprising:
   a. leaching the ore with mineral acid in the presence of water to produce a pregnant liquor stream containing dissolved copper values, and washing the leached ore residue with an internal recycle stream from step (c) in addition to other wash waters,
   b. passing additional water through the leach vessel containing spent ore residues, said ore being disposed from the recovery system and said water being subsequently combined with the pregnant liquor stream from step (a) to form a resultant stream which is then passed through
   c. at least one first extraction stage containing an extraction agent for removal of copper values, said extraction stage producing a loaded organic extraction stream and an aqueous raffinate stream containing metal values not extracted from resultant stream of step (b) and separating said raffinate stream into a first internal stream of aqueous raffinate and a second internal stream of aqueous raffinate,
   d. passing the first internal raffinate recycle stream back to step (a) leach system, and
   e. passing the second internal stream to a second extraction having at least one extraction stage containing a second extracting agent where the copper values are extracted in the presence of a low pH extracting agent, said extraction stage producing a loaded organic stream and a disposal stream, while
   f. the loaded organic stream from step (e) is stripped in at least one stripping stage in the presence of sufficient stripping acid containing aqueous stripping agent, resulting in a stripped organic stream and a loaded stripping acid stream
   g. recycling the stripped organic stream from step (f) to the extraction stage of step (e) while
   h. the loaded stripping acid stream of step (f), containing recovered copper values is passed to the process described in step (a), while
   i. the loaded organic stream produced in step (c) is passed through at least one stripping stage wherein a stripped organic stream and a pregnant electrolyte stream is produced, subsequently
   j. recycling the stripped organic stream to the resultant stream extraction of step (c), while
   k. passing the pregnant electrolyte to a copper recovery process from which exits a spent electrolyte stream which is recycled to step (i) as a stripping agent, while 1. recovering the copper values as metal from step (k).

2. A process as described in claim 1 wherein the leach process is a vat leach process.

3. A process as described in claim 2 wherein the step (c) extraction agent is selected from the group consisting of alpha hydroxy oximes, benzophenone oximes, and alkyl hydroxphenyl alkyl ketoximes.

4. A process as described in claim 3 wherein the extraction agent is selected from the group consisting of 2-hydroxy-5-nonyl acetophenone oxime, 5-alkyl-2-hydroxyphenyl alkyl ketoximes, 8-hydroxyquinolines, 2-hydroxy-3'-methyl-5-ethylbenzophenoxime, 2-hydroxy-5-(1,1-dimethylpropyl)-benzophenoxime, 2-hydroxy-5-(1,1-dimethylethyl)-benzophenoxime, 2-hydroxy-5-octylbenzophenoxime, 2-hydroxy-5-nonyl-benzophenoxime, 2-hydroxy-5-dodecyl-benzophenoxime, 2-hydroxy-2',4'-dimethyl-5-octylbenzophenoxime, 2-hydroxy-2',3',5'-trimethyl-5-octylbenzophenoxime, 2-hydroxy-3,5-dinonylbenzophenoxime, 2hydroxy-4'-(1,1-dimetylethyl)-5-(2-pentyl)-benzophenoxime, 2-hydroxy-4'-(1,1-dimethylethyl)-5-(2-butyl)-benzophenoxime, 2-hydroxy-4-dodecyloxybenzophenoxime, 2-hydroxy-4'-(1,1-dimethylethyl)-5-methyl-benzophenoxime, 2-hydroxy-4',5-bis-(1,1-dimethylethyl) benzophenoxime.

5. A process as described in claim 1 wherein the step (e) extraction agent is a chlorinated hydroxy benzophenone oxime.

6. A process as described in claim 2 wherein the loaded stripping acid stream of step (f) is passed through an acid mixing stage where sufficient fresh acid is added to yield a solution containing the described amount of acid for the process of step (a) before being passed to step (a).

7. A process as described in claim 1 wherein a mineral acid is added to the wash water of step (b) and the resulting solution utilized as a leaching agent in a dump leach, producing a second pregnant liquor stream.

8. A process as described in claim 7 wherein the pregnant liquor stream from the dump leach is combined with the pregnant liquor produced in step (a) prior to passage to step (c).

9. A process as described in claim 1 wherein the first internal stream of raffinate of step (c) is further divided to form a third and fourth recycle streams, said third recycle stream passing to step (a) and the fourth recycle stream being combined with acid to form a leaching agent for a dump leach, producing a pregnant leach liquor.

10. A process as described in claim 9 wherein the pregnant leach liquor from the dump leach is combined with the pregnant leach liquor of step (a) and the wash waters of step (b) to form the feed to step (c).

11. A process as described in claim 9 wherein the pregnant leach liquor from the dump leach is added to the leach system of step (a) to produce the pregnant leach liquor of step (a).

* * * * *